United States Patent
Dutcher

Patent Number: 5,878,563
Date of Patent: Mar. 9, 1999

[54] ERGONOMIC RAKE

[76] Inventor: Paul Leslie Dutcher, 28 Drake St., Asheville, N.C. 28806

[21] Appl. No.: 798,112

[22] Filed: Feb. 12, 1997

[51] Int. Cl.⁶ .................................................. A01D 7/00
[52] U.S. Cl. ................................. 56/400.04; 56/400.17; 56/400.14
[58] Field of Search .......................... 56/400.17, 400.04, 56/400.06, 400.18, 400.19, 400.2, 400.14; 7/167, 168; 16/110 R

[56] References Cited

U.S. PATENT DOCUMENTS

| | | |
|---|---|---|
| 462,918 | 11/1891 | Zabel . |
| 738,057 | 9/1903 | O'Connor . |
| 910,274 | 1/1909 | Duprey . |
| 2,484,409 | 10/1949 | Jameson . |
| 2,758,320 | 8/1956 | Ettlinger, Jr. ..................... 56/400.06 |
| 3,095,682 | 7/1963 | Pasquine ............................. 56/400.17 |
| 4,791,780 | 12/1988 | Phillips ................................ 56/400.04 |
| 5,058,370 | 10/1991 | Russell ............................ 56/400.19 X |
| 5,249,413 | 10/1993 | McDonough, Jr. . |
| 5,303,536 | 4/1994 | Tolliver . |

*Primary Examiner*—Terry Lee Melius
*Attorney, Agent, or Firm*—Carter & Schnedler, P.A.

[57] ABSTRACT

There is provided an ergonomic rake which includes an elongated handle having first and second ends. A head is attached to the handle at its first end. The second end of the handle is a free end. A bend is provided in the handle so that the user of the rake may remain in a substantially upright position while raking to reduce the likelihood of a back injury. A support stand is rotatably attached to one side of the head. By using the support stand, the rake may be stood up while not in use so that the user does not need to bend over to pick up the rake, which also reduces the likelihood of a back injury.

11 Claims, 3 Drawing Sheets

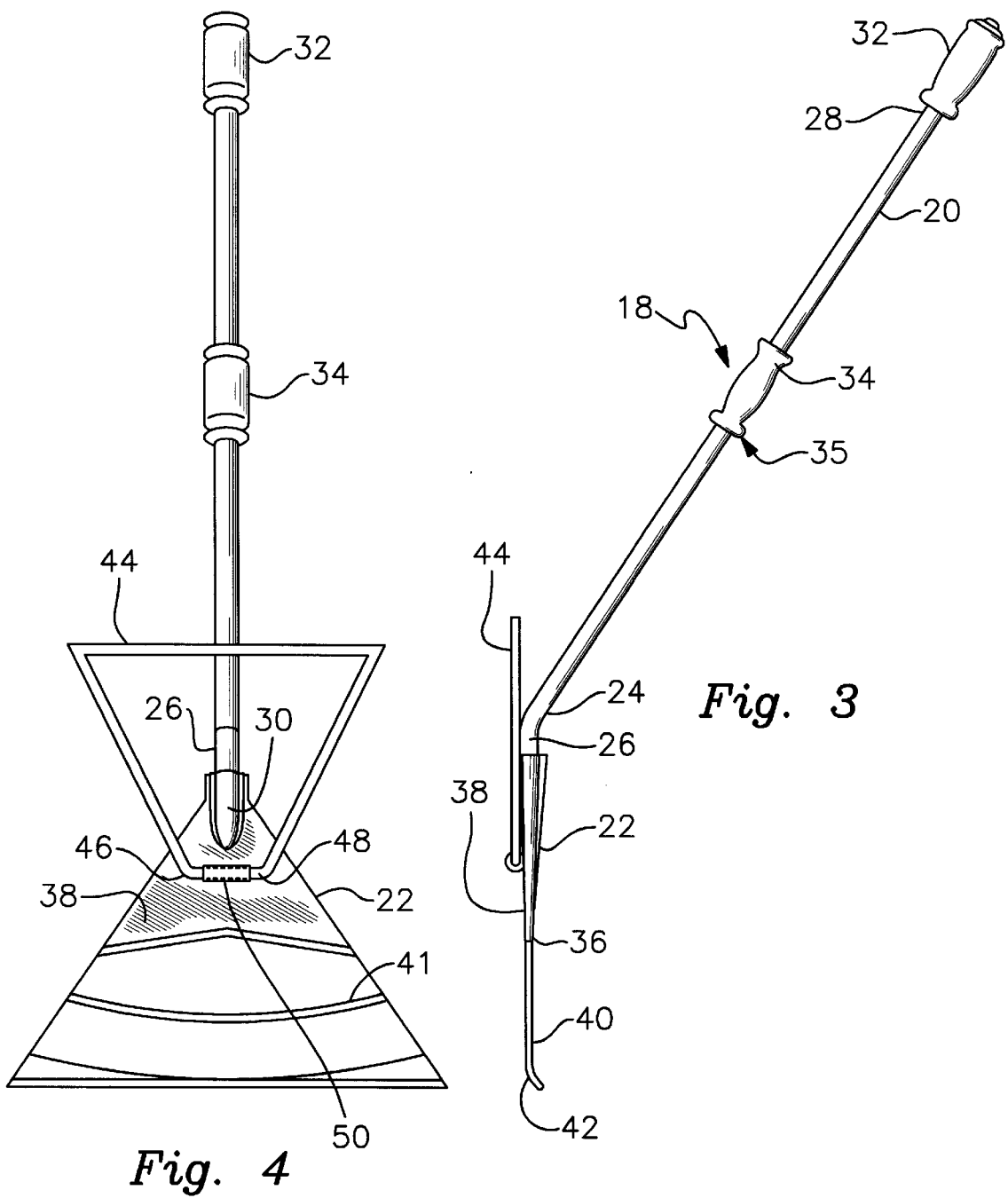

ERGONOMIC RAKE

BACKGROUND OF THE INVENTION

This invention relates to rakes. More particularly, it relates to ergonomically designed rakes which help avoid back injuries.

A standard yard rake has an elongated straight handle attached to a raking head. The standard rake has been known to cause the user back injuries because the user must bend his back in order to properly use the rake. The use of a standard rake is illustrated in FIG. 1. In addition, when the rake is not in use, it often is laid flat on the ground. Thus when the user is ready to use the rake, he must bend over and pick up the rake from the ground, which also can cause back injuries.

OBJECTS OF THE INVENTION

It is therefore one object of this invention to provide an ergonomically designed rake.

It is another object of this invention to provide an ergonomically designed rake which will help avoid back injuries.

It is still another object of this invention to provide an ergonomically designed rake which is inexpensive to produce and easy to use.

SUMMARY OF THE INVENTION

In accordance with one form of this invention, there is provided an ergonomic rake which has an elongated handle having first and second ends. A head is attached to the handle at the first end. The second end of the handle is a free end. A bend is provided in the handle so that the user of the rake may stand in substantially an upright position while raking.

It is preferred that one side of the head of the rake is adapted to make primary contact with the material to be raked and that the direction of the bend is such that the free end of the handle is nearer to the side of the head which makes primary contact with the material to be raked than to the other side of the head. It is preferred that the bend be located between the mid portion of the handle and the head. In addition, it is preferred that the range of the angle of the bend be between 8° and 45°.

It is also preferred that the rake include a support stand rotatably mounted to the head so that when the support stand is down, the rake may be placed in an upright position when not in use so that the user does not have to bend over to pick up the rake.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

FIG. 3 is a side elevation view of the ergonomic rake of the subject invention;

FIG. 4 is a rear elevational view of the rake shown in FIG. 3; and

DESCRIPTION OF THE PREFERRED EMBODIMENT

Figure 1:
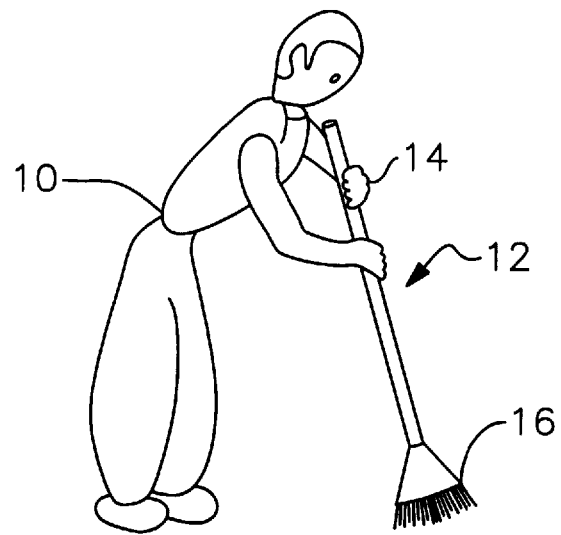
FIG. 1 is a pictorial view of a person using a prior art rake.

FIG. 1 shows a person 10 utilizing a standard rake 12. Standard rake 12 includes a straight handle 14 attached to head 16. Because the rake handle is straight, the user must bend his back over in order to properly operate the rake. This has resulted in numerous back injuries. In addition, when the user is not operating the rake, he simply drops it to the ground, unless he is able to find something to lean the rake against. When it is time for the user to operate the rake again, he must then bend over and pick up the rake off the ground, again, straining his back.

Figure 2:
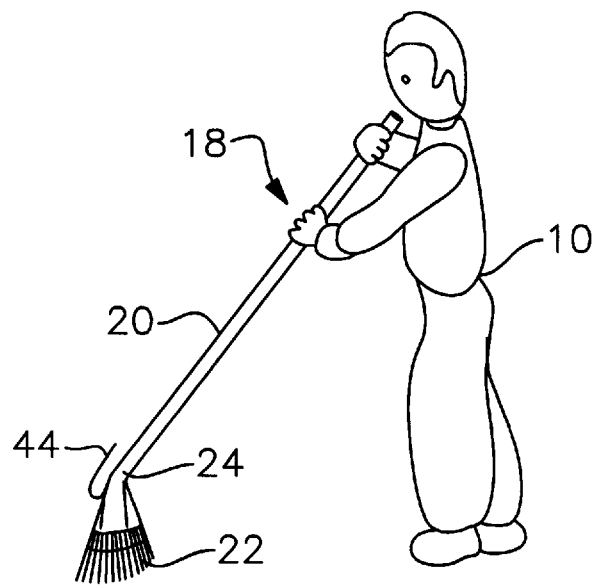
FIG. 2 is a pictorial view of a person using the ergonomic rake of the subject invention.

FIG. 2 shows the same person 10 utilizing rake 18 of the subject invention. Rake 18 includes elongated handle 20 which is attached to head 22. Handle 20 includes bend 24 which enables the user to stand substantially in the upright position while raking.

Figure 5:
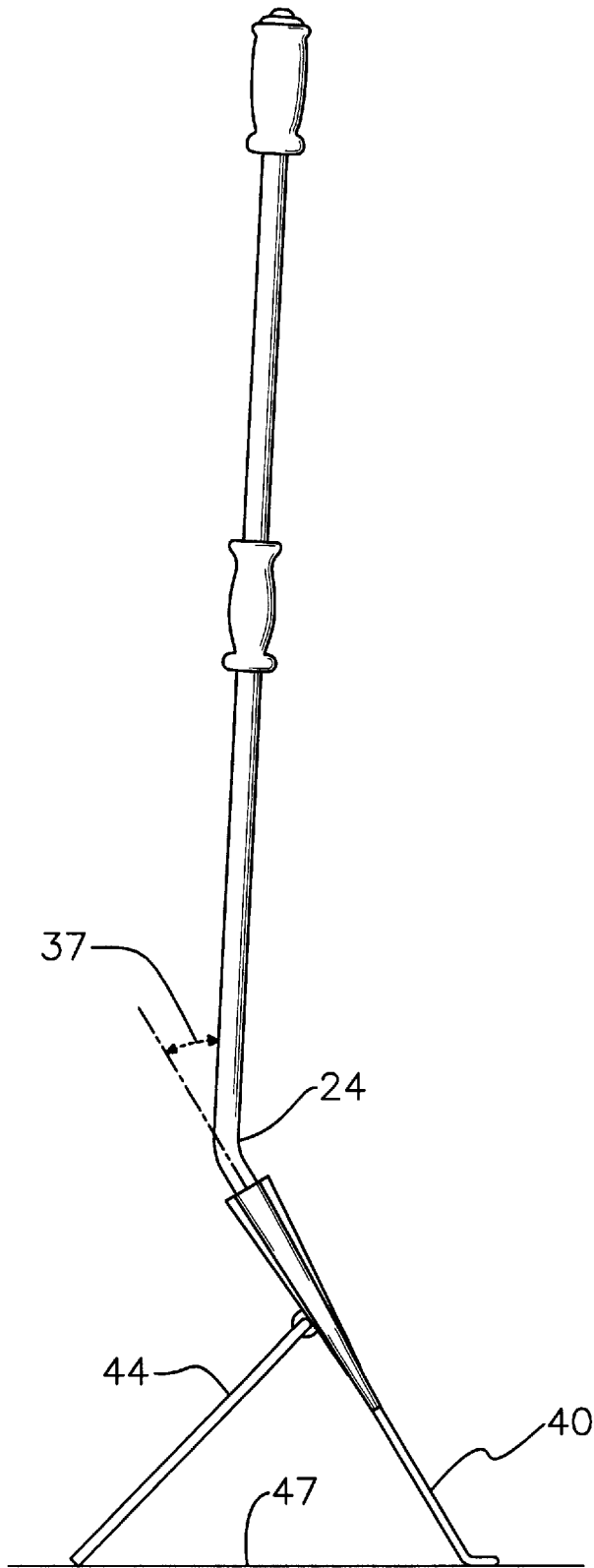
FIG. 5 is a side elevational view of the rake of FIG. 3, however, with the support stand rotated downwardly.

FIGS. 3, 4 and 5 show the details of ergonomic rake 18. Handle 20 of rake 18 includes first end 26 and second end 28. Preferably, handle 20 is made of aluminum or fiberglass. The first end 26 of the handle is connected to head 22 by insertion into a slot 30 which is provided in head 22. The end 26 of the handle is glued into slot 30 to secure the head to the handle. First grip 32 is connected to the second end 28 of the handle. Second end 28 forms a free end of the handle. A second grip 34 is attached to handle 20 near its mid portion 35. Bend 24 is provided in handle 20 between the first end 26 and mid portion 35. Preferably, the angle 37 of bend 24 is in the range of 8° to 45°, and ideally, at an angle of 26°.

Head 22 includes first side 36 and second side 38. A plurality of tines 40 are attached to head 22. The ends 42 of tines 40 are curved and extend away from side 36. Side 36 and tines 40 are adapted to make primary contact with the material to be raked, such as leaves and the like. As shown in FIG. 4, the tines 40 are reinforced by bar 41.

The direction of bend 24 is such that the second end 28 of the handle, which is its free end, is nearer to the first side 36 of head 22 than to second side 38. That is, the portion of the handle 20 between bend 24 and second end 28 is on the side 36 of head 22. By bending the handle in that direction, the user 10, as shown in FIG. 2, may stand substantially upright when using the rake, thereby greatly reducing the possibility of a back injury during raking. In addition, the bend in the handle permits the user to apply a greater amount of pressure when raking since the head 22 will not substantially flex backwards, which happens to prior art rakes. Thus the user may pull larger amounts of debris and do a cleaner job.

Referring now more particularly to FIG. 4, rotatable stand 44, which is trapezoidal in shape, is attached to the second side 38 of head 22. Ends 46 and 48 of stand 44 are received in slot 50 which projects from the surface of second side 38 of head 22. Thus stand 44 may rotate, as shown in FIGS. 3 and 5. FIG. 3 shows stand 44 rotated in the upward position while the rake is in use, as shown in FIG. 2. FIG. 5 shows the stand 44 rotated to the downward position while the rake is not in use. When the stand 44 is rotated in the downward position, the stand 44 and the tines 40 make contact with the ground 47 so that the rake will stand up on its own. Thus the user does not need to bend over to pick up the rake when he wants to use the rake. This feature also lowers the risk of back injury. The length of the rake is preferably between 62 inches and 64 inches, and ideally is 64 inches in length.

While the preferred embodiment of this invention shows a yard or leaf-type rake, this invention is also applicable to other types of rakes and implements, such as a garden hoe and the like.

From the foregoing description of the preferred embodiment of the invention, it will be apparent that many modifications may be made therein. It will be understood, however, that the embodiment of the invention is an exemplification of the invention only and that the invention is not limited thereto. It is to be understood, therefore, that it is intended in the appended claims to cover all modifications as fall within the true spirit and scope of the invention.

I claim:

1. An ergonomic rake comprising:

an elongated handle; said handle having first and second ends;

a head; said head attached to said handle at said first end; said second end of said handle being a free end;

a bend in said handle; said head having first and second sides; said first side of said head adapted to make primary contact with material to be raked; the direction of said bend being such that said second end of said handle is nearer to said first side of said head than to said second side of said head, whereby the user of said rake may stand in a substantially upright position while raking;

a support stand; said support stand attached to said rake; said support stand is rotatable attached to said second side of said head; said stand being rotatable to a down position, whereby said stand and said head will make contact with the ground so that said rake may be placed in the upright position when not in use so that the user need not bend over to pick up the rake.

2. A rake as set forth in claim 1, wherein said handle includes a mid portion; said bend being between said mid portion and said first end of said handle.

3. A rake as set forth in claim 2, further including a first grip on said second end of said handle and a second grip located near said mid point of said handle.

4. A rake as set forth in claim 1, wherein said head includes a plurality of tines.

5. A rake as set forth in claim 4, wherein said tines are curved and extend away from said first side of said head.

6. A rake as set forth in claim 1, wherein the angle of said bend is in the range of 8° to 45°.

7. A rake as set forth in claim 6, wherein the angle of said bend is 26°.

8. A rake as set forth in claim 1, wherein the length of said rake is in the range between 62 inches and 64 inches.

9. A rake as set forth in claim 8, wherein the length of said rake is 64 inches.

10. A rake as set forth in claim 1, wherein said stand is trapezoidal in shape.

11. A rake as set forth in claim 1, wherein said stand is adapted to be rotated upwardly when said rake is in use.

* * * * *